United States Patent [19]

Gohara

[11] Patent Number: 5,461,912
[45] Date of Patent: Oct. 31, 1995

[54] ACCURATE METHOD OF MEASURE TRAY PRESSURE DROP TO DETERMINE LIQUID FLOW IN FLUE GAS DESULFURIZATION SYSTEMS

[75] Inventor: Wadie F. Gohara, Barberton, Ohio

[73] Assignee: The Babcock & Wilcox Company, New Orleans, La.

[21] Appl. No.: 252,024

[22] Filed: Jun. 1, 1994

[51] Int. Cl.⁶ ............................................. G01F 5/00
[52] U.S. Cl. ........................ 73/202; 73/861; 73/861.61
[58] Field of Search ....................... 73/198, 202, 202.5, 73/861, 861.52, 861.61

[56] References Cited

U.S. PATENT DOCUMENTS

| | | | |
|---|---|---|---|
| 3,805,612 | 4/1974 | Shiba | 73/861.61 |
| 4,130,017 | 12/1978 | Benedict et al. | 73/861.61 |
| 4,168,725 | 9/1979 | Astakhov et al. | 73/861.61 |
| 4,285,245 | 8/1981 | Kennedy | 73/861 |
| 4,475,387 | 10/1984 | Hawk et al. | 73/202.5 |
| 5,038,608 | 8/1991 | Sakai et al. | 73/202 |
| 5,086,655 | 2/1992 | Fredericks et al. | 73/861.61 |
| 5,134,890 | 8/1992 | Abrams | 73/861.52 |
| 5,313,955 | 5/1994 | Rodder | 73/861.52 |

*Primary Examiner*—Richard Chilcot
*Assistant Examiner*—Eric S. McCall
*Attorney, Agent, or Firm*—Daniel S. Kalka; Robert J. Edwards

[57] ABSTRACT

A method for measuring a pressure drop at a component within a flue gas desulfurization vessel caused by a gas flow includes locating a plurality of taps near the component to be measured in order to receive a portion of the flow. A line leading from the tap is connected to a pressure measuring device in order to measure the pressure at the component based on the flow fed into the tap. After the pressure is measured, the line is disconnected from the pressure device and connected to a cleaning device in order to clean the connecting line and tap. After cleaning the tap, air is blown through the line in order to dry the line for the next measurement. The pressure drop determined is used to calculate the liquid flow passing through the system from pre established relationships.

15 Claims, 3 Drawing Sheets

ACCURATE METHOD OF MEASURE TRAY PRESSURE DROP TO DETERMINE LIQUID FLOW IN FLUE GAS DESULFURIZATION SYSTEMS

BACKGROUND OF THE INVENTION

1. Field of the Invention

The present invention relates, in general, to the desulfurization of flue gas or closed vessels where liquid is sprayed into a gas stream and, in particular, to a new and useful method and arrangement for measuring the pressure drop across a component contained within a flue gas desulfurization system.

2. Description of the Related Art

It is well-known that the accurate determination of liquid flow in a flue gas desulfurization (FGD) system is essential to evaluate and optimize the performance of the system. Conventional methods such as measuring pump drawn currents and pump total developed head depend largely on the condition of the pump and require a well developed knowledge of the system resistance. These methods attempt to measure the flow by following measuring the performance of the source and assuming that the rest of the system is operating as designed. Ultrasonic meters have been used for the measurements and are non-intrusive; but they require a certain length of pipe which may not be available in a lot of instances. Magnetic meters are also used but tend to be intrusive and require a straight pipe which may not be readily available.

Orifices have also been used in the pipes. However, the erosive nature of the slurry makes their use limited. Moreover, orifice meters are not suited for flow measurements in a vertical run of pipe because of the slurry deposition on the downstream face of the orifice and the continuous change in its flow characteristics. In a horizontal run of pipe, eccentric orifices are used to reduce the stream deposition upstream and downstream deposition of slurry but are still susceptible to erosion.

Some global problems encountered with orifice meters are listed below as follows. They restrict flow into the header; therefore, unless the system is designed with the orifice meter in mind, the flow characteristics of the system are expected to change with the introduction of the orifice. The flow measured by the orifice is an indication of the flow of the orifice location; and if multiple headers branch downstream of the header, there is no indication of the flow of the delivery point to the nozzle. Also, the characteristics of the orifice change as erosion takes its toll on the orifice. Furthermore, slurry from the FGD system gets into the orifice taps thereby plugging them, and rendering the orifice useless after only a few hours of operation.

Additionally, protection devices such as diaphragms have also been used. Pressure gauges with diaphragms tend to protect the gauge and overcome the plugging problem, but they have the same problems encountered with orifices.

Presently, there is no known system or method which provides for an accurate and efficient measurement of pressure drop for a component in a flue gas desulfurization vessel.

SUMMARY OF THE INVENTION

The present invention uses the pressure drop of components such as an absorption tray to determine the liquor flow. This method uses knowledge of the tray design and characteristics as an orifice meter, which, in turn, provides an accurate means of measurement of the tray pressure drop.

The present invention provides a reliable means to measure the tray pressure drop, as well as other components within the FGD vessel, and uses it in conjunction with the tray characteristics to determine the flow rate of either phases, gas or liquid flowing through the system. If the gas flow is known, the liquid flow can be determined and vice versa. Gas flow measurements are easy and more reliable. Therefore, if the pressure drop is determined by a reliable and reproducible method or apparatus, the liquid flow can be determined.

The present invention is a simple, reliable and primary method to determine both gas flow patterns and pressure drop inside a closed vessel in which water or slurry is sprayed into a gas stream while the system is in actual operation. The present invention is also an arrangement used to carry out this method.

The ability to distinguish uneven flow patterns help in developing well-engineered and reliable systems. The present invention uses primary measuring devices, such as manometers, to determine the flow patterns inside the vessel. The use of a primary device eliminates the error or doubts created from the use of instruments that require calibration and are usually affected by the measured medium. Pressure drop of the vessel components such as trays, spray headers, or other internal components are determined reliably using the present invention.

Regardless of how scattered the components to be measured are, a measuring station is set in a single location where all the measurements and equipment is located. Unlike probes and other measuring devices, all measurements are made in one location. Several pressure taps are located across the component to be measured, such as the tray, in order to account for maldistribution and provide more reliable measurements than a single point measurement. Regardless of how scattered the taps are, all taps are collected into a single measuring station.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention is a method and arrangement for measuring a pressure drop caused by a gas, liquid or slurry flow at a component contained within a closed vessel such as flue gas desulfurization vessel.

Figure 1:
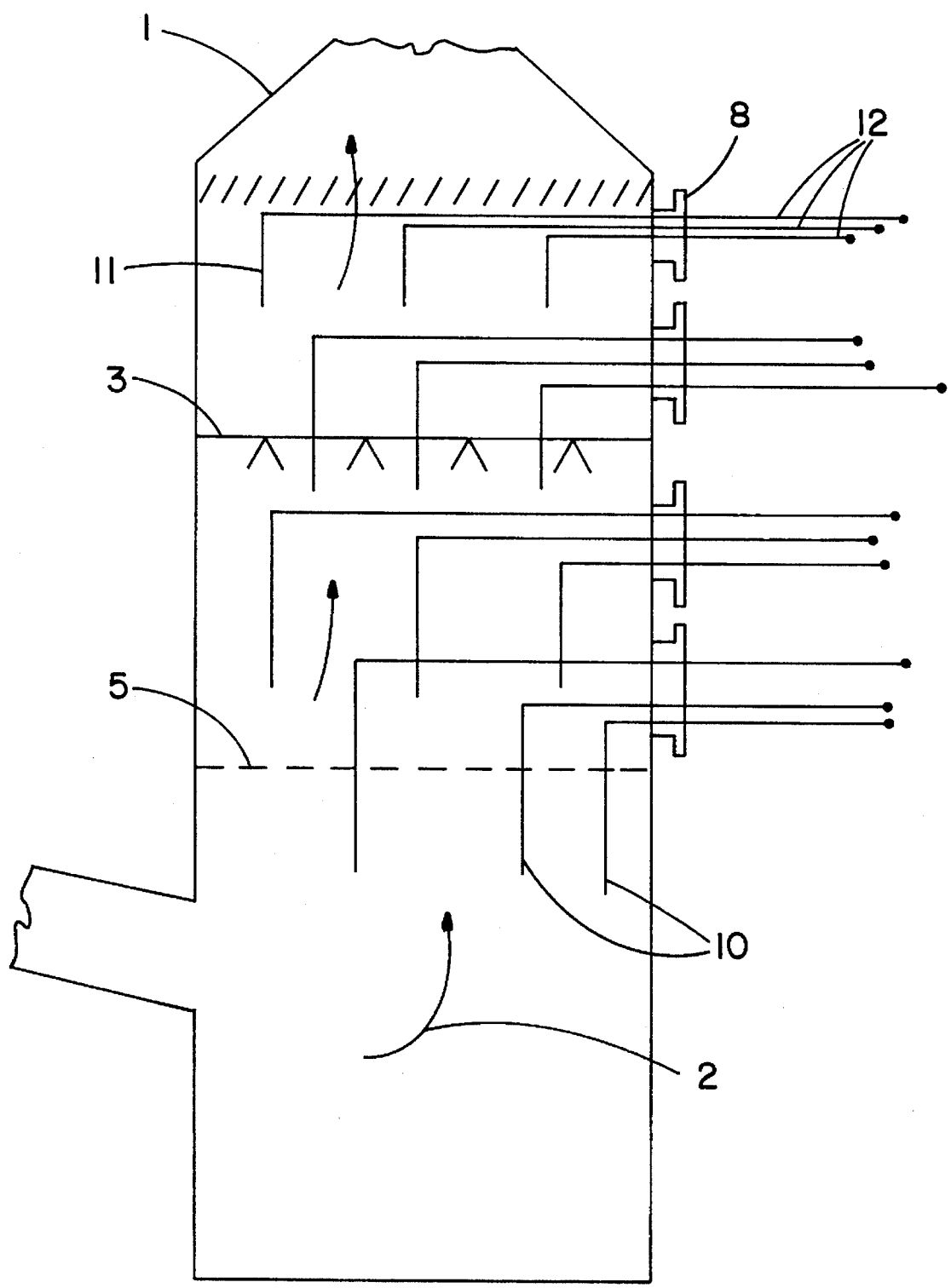
FIG. 1 is a schematic view illustrating an arrangement for measuring a pressure drop of a component contained within a flue gas desulfurization vessel according to the present invention.

The present invention utilizes an efficient and reliable method for determining gas flow patterns inside a closed vessel 1, as shown in FIG. 1, in which water or slurry is sprayed from a spray header array 3 into a gas stream or gas flow 2 which flows upwardly through the housing 1 of the FGD system while the system is in operation. The present invention allows for pressure drop to be measured for the components of the vessel 1 such as a tray 5, or the headers 3, or mist eliminator 8. The present invention allows for pressure drop measurements to be taken at any location of the housing 1 or at any component thereof.

Figure 2:
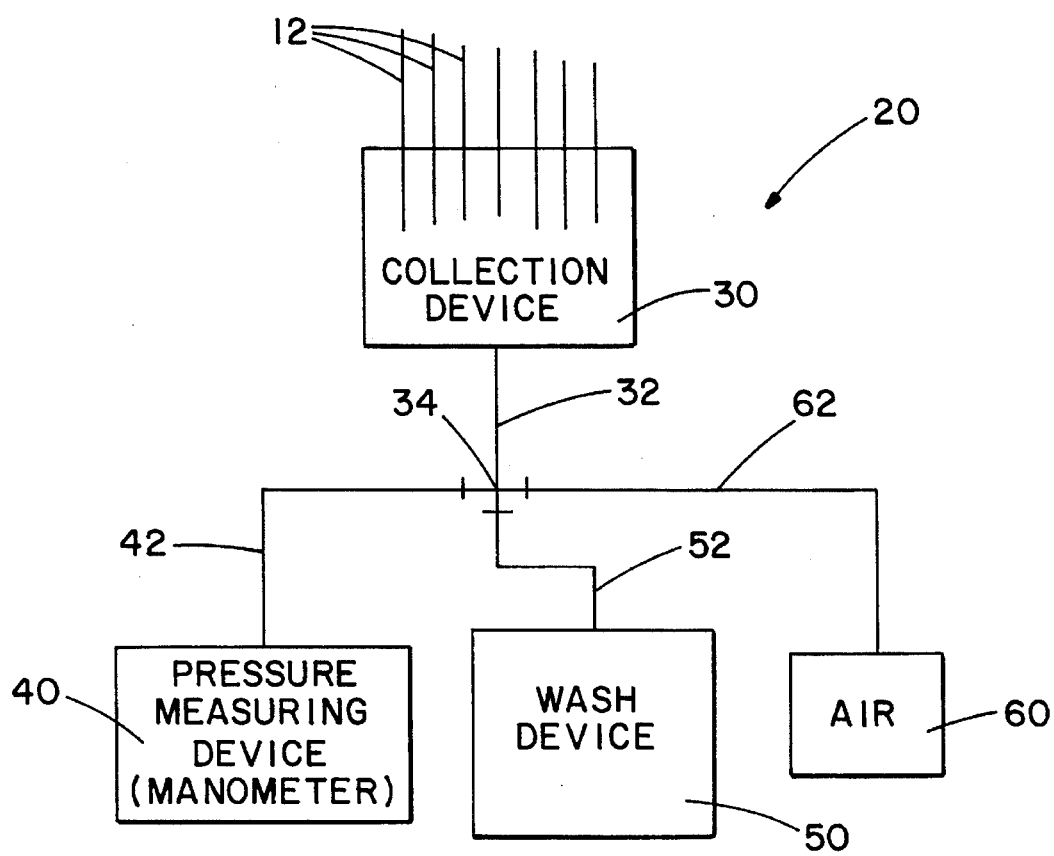
FIG. 2 is a schematic diagram illustrating a single work station for the arrangement of FIG. 1.

Measurements for gas flow distribution are made using a network of pressure taps 10, which are tubes, that are located across the gas free flow area. The taps are mounted and connected separately through the vessel wall in one or multiple locations and routed to a single work station generally designated 20 (FIG. 2).

The taps 10 are located strategically inside the FGD vessel 1 and are positioned vertically within the vessel 1 facing the gas stream 2 at an open end 11 of each tap 10 which facilitates measuring the impact or total pressure of the gas 2 at the measurement site. The impact pressure consists of two components: static, and velocity pressures. At the same elevation, the static pressure is the same. Thus, any variation in the total pressure is due to variation in the velocity pressure. The velocity pressure is a function of the local gas velocity and provides a profile of the gas flow inside the vessel under actual operating conditions.

The taps 10 are made of ½ inch diameter tube of an appropriate heat and corrosion resistant material in order to withstand the vessel chemistry. The taps 10 are located near a component or are fastened to any component at an elevation at which the gas profile or pressure drop needs to be determined. Each tap 10 (typically from 3 to 35 taps are used) is routed separately and connected inside the vessel 1 to flange 8 located at the vessel wall. Connecting tubing 12, typically ¼ inch diameter tube and also made of a heat resistant material, such as plastic that can withstand pressures up to 80 psi, is connected to the taps 10. Outside the vessel, the plastic tubing 12 is routed from each tap line 10 at the flange 8 to a water wash header 50 (FIGS. 2 and 3) which is located at the central work station 20.

The taps 10 and connecting tubes 12 receive a portion of flow 2 and channel the portion of the flow 2 therethrough. Dry air was originally used to keep the taps 10 clear, however, the presence of dissolved solids in the liquor 2 caused the solids to deposit on the wet/dry interface and plug the taps 10. Therefore, humidified air or water wash is used by the present invention to successfully keep the tap 10 open and prevent plugging at the wet/dry interface. A liquid or water wash is preferred to humidified air because it also provides continuous cleaning of the lines.

As illustrated in FIG. 1, the taps 10 are strategically located inside the FGD vessel 1 and are either located near the components, i.e. tray 5 or headers 3, or connected to the components directly. The open end 11 of the taps 10 are in direct alignment or face the gas flow 2 and are located at various positions, ranging from a few inches below the component to be measured to a few inches above the component below it, preferably, 1 to 2 feet below the component and no more than a few inches above the component to be measured to a few inches below the component above it. The main object of the invention is to keep all taps 10 and open end 11 at the same elevation to void the effect of static pressure. The vertical arrangement of the taps 10 allows for a portion of the flow 2 to be channeled therein at open end 11 and, in turn, channeled through the tap 10 and into the connecting tube 12 for being channeled out of the FGD vessel 1 at the flange 8.

The portion of the collected flow 2 is channeled through connecting tubes 12 to the central work station 20. The central work station 20 is a single location wherein one embodiment includes a collection device 30, which is a sealed housing such as a bubbler, in which the opposite ends of the connecting tubes 12 are contained therein. The work station 20 includes a line 32 which is connected to the collection device 30 and a central valve 34, which can be a 3-way valve controlled remotely, and is in turn connected to a pressure measuring device 40, such as a manometer, by line 42; and a cleaning or wash device 50, such as a water wash, liquid or humidified air device, by line 52; and an air source 60 which provides drying and purging for the connecting tubes 12 and the taps 20 by blowing air from air source 60 through line 62 and open valve 34 along line 32 into the collector 30.

Figure 3:
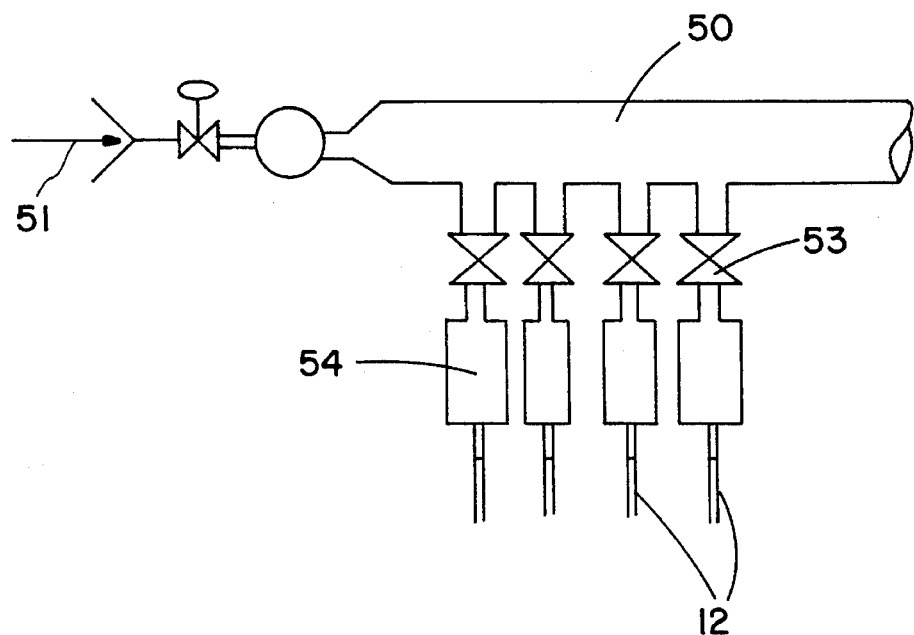
FIG. 3 is a schematic view illustrating a cleaner device for the arrangement of FIG. 1.

As illustrated in FIG. 3, a cleaner or water wash header 50 utilizes a liquid or water source 51 which is channeled directly to the connecting tubes 12 through valves 53 for cleaning out build-up within the connecting tubes 12 and the taps 10. A sight glass 54 is provided for each connecting tube 12 for viewing liquid levels flowing therethrough and evenly distribute the water wash fluid.

The water wash header 50 provides continuous flow of the water 51 to each tap 10, when pressure measurements are not being taken, to avoid inclusion of liquid or slurry droplets within the taps 10 and connecting tubes 12. As is well-known, slurry or liquor containing solids tend to dry inside of the taps and cause plugging which reduces the reliability of the system and results in poorly reproducible data.

Figure 4:
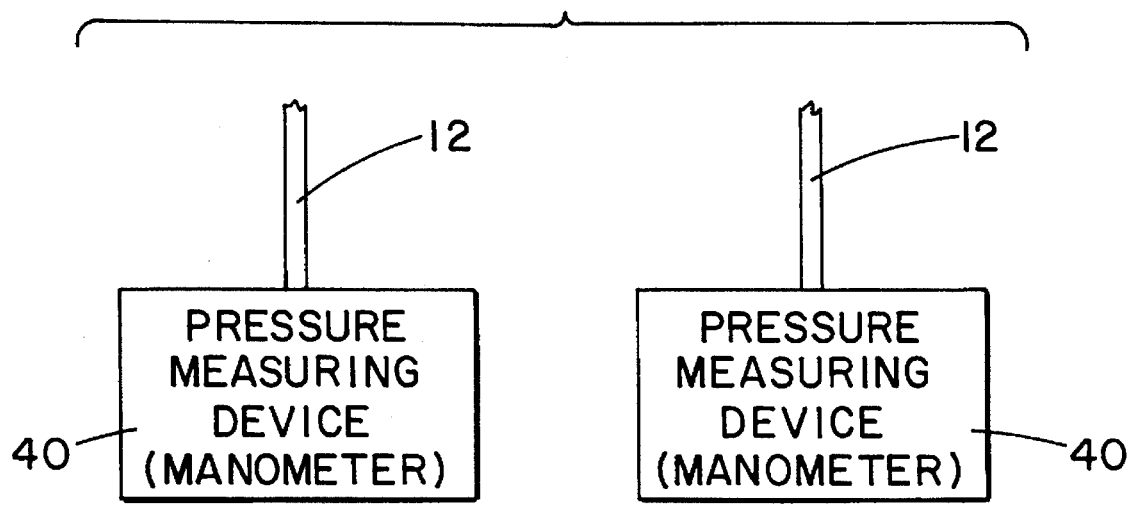
FIG. 4 is a schematic view illustrating a pressure measuring system for the arrangement of FIG. 1.
Figure 5:
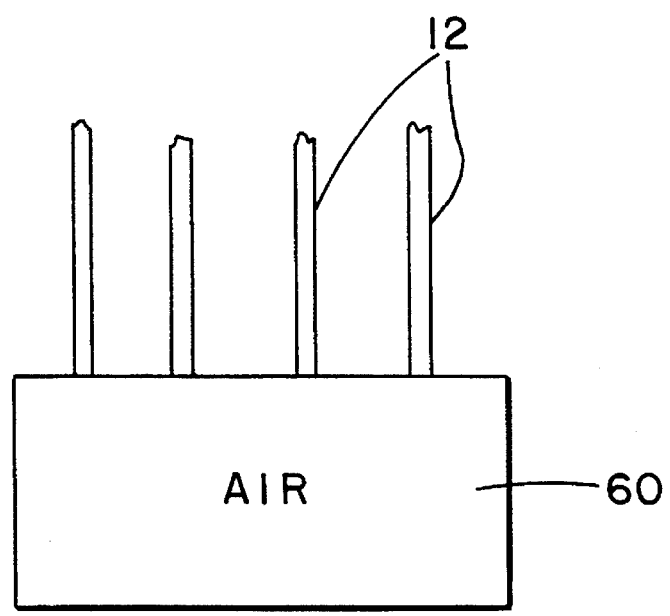
FIG. 5 is a schematic view illustrating a drying device for the arrangement of FIG. 1.

According to the present invention, a second embodiment for the work station 20 does not include the collection device 30 (FIG. 2), but instead allows for the connecting tubes 12 to be detachably connected to each of the cleaning header sight glasses 54 (FIG. 3), the pressure measuring devices 40 (FIG. 4) and the air source 60 (FIG. 5).

At the work station 20 (FIG. 2), the connecting lines 12 are connected to wash header 50 for providing wash water or an appropriate flushing fluid 51 to the taps 10, which are connected to the connecting lines 12. This ensures an adequate flow to each of the taps 10 regardless of location, resistance or height.

Once the connecting tubes 12 have been washed with washing fluid 51 from the washing header 50, the connecting tubes 12 are disconnected from the wash header 50 and are connected to the air source 60 as illustrated in FIG. 5. The air source 60 is an air header which provides a source of compressed air for drying and purging clearing the flushing liquid 51 (FIG. 3) out of lines 12 and 10 prior to the line 12 being connected to the primary measuring device or manometer 40 as shown in FIG. 4.

Once the compressed air is channeled through the connecting lines 12 and taps 10, and the lines 10 and 12 are dried, the connecting tubes 12 are disconnected from the air source 60 and connected to the primary pressure measuring device 40 which provides for a measuring of the pressure at the components. After the pressure measurements are taken, the connecting tubes 12 are disconnected from the measuring devices 40 and reconnected to the water header 50 for cleaning the lines 10 and 12 respectively.

The water wash 51 (FIG. 3) is maintained at all times, when measurements are not being made, at a rate dependant on the temperature of the vessel 1 (FIG. 1) and the solubility of the solids that could entrain and plug the taps 10. A positive flow of water or flushing liquid 51 into the vessel 1 is maintained through the lines 10 and 12 and monitored through the sight glass 54 in order to prevent plugging thereof.

The method according to the present invention can be summarized as follows: at the time measurements are made, the connecting lines 12 are disconnected from the wash header 50 and connected to air source 60 so that they can be drained and blown with compressed air in order to dry and remove any liquid droplets from the lines 12 and 10. Each line 12 is connected separately to a manometer 40 (FIG. 4) in order to measure the total pressure and then reconnected to the wash header 50. The process is repeated for all taps at one elevation in order to determine a gas flow profile, or to taps on different elevations (across a vessel component) to measure pressure drop across such a component.

Measurement for gas flow are made using traditional methods such as a Fechheimer probe or other similar reliable multi-directional probes.

The present invention provides for several advantages such as traversing the vessel 1 at different elevations which is performed from one work station 20 unlike probes that require moving equipment to the elevation at which the measurements need to be made.

Also, the water flush 51 provides a reliable means to make repetitive measurements over a period of time.

The air blown from air source 60 cleans the lines 12 and taps 10 and provides the operator with positive proof that the tap 12 is not plugged. Also, by using a primary measuring device, such as manometer 40 to measure -the pressure, problems are eliminated such as the need to calibrate transducers or electronics.

Unlike traverse probes, the location of the taps 10 inside the vessel 1 for the present invention is not limited by the presence of access. The taps 10 can be located in any order or at any elevation in the vessel 1. The profile can be taken at an elevation where there is no access because the tap lines can be routed to the nearest flange or port 8. Also, access to the vessel internals allows for the pattern of the taps to be changed in order to investigate suspect areas without the limitation imposed by rigid probes.

Pressure drop data gathered by the method according to the present invention is reproducible from day to day. When the component pressure drop measurements are made accurately for trays or orifices, the data can be used to verify liquid flow using previously developed pressure drop flow relationships.

While specific embodiments of the invention have been shown and described in detail to illustrate the application of the principles of the invention, it will be understood that the invention may be embodied otherwise without departing from such principles.

What is claimed is:

1. An arrangement for measuring a pressure caused by a flow at a component contained within a flue gas desulfurization vessel, the arrangement comprising:

tube means near the component for receiving a portion of the flow and channeling the portion of the flow from the vessel;

collection means for receiving the portion of the flow channeled from the vessel;

means for measuring the pressure at the component based on the portion of the flow received by the tube means, the measuring means being operatively connected to the collection means;

means for cleaning the tube means, the cleaning means being operatively connected to the collection means;

means for drying the tube means, the drying means being operatively connected to the collection means; and valve means for regulating the operation of the means for measuring pressure, the cleaning means and the drying means.

2. The arrangement according to claim 1, wherein the tube means is detachably connected to the means for measuring the pressure.

3. The arrangement according to claim 2, wherein the tube means is detachably connected to the cleaning means.

4. The arrangement according to claim 1, wherein the tube means is detachably connected to the cleaning means.

5. The arrangement according to claims 3, wherein the tube means is detachably connected to the drying means.

6. The arrangement according to claim 1, wherein the drying means comprises an air source.

7. The arrangement according to claim 1, wherein the cleaning means comprises a liquid source.

8. The arrangement according to claim 1, wherein the tube means includes a receiving end.

9. The arrangement according to claim 8, wherein at least a section of the tube means is positioned vertically within the flue gas desulfurization vessel such that the receiving end is facing into the flow.

10. The arrangement according to claim 9, wherein the receiving end of the tube means is located a few inches below the component to a few inches above the component below the one to be measured.

11. The arrangement according to claim 9, wherein the receiving end of the tube means is located no more than a few inches above the component to a few inches below the component above the one to be measured.

12. The arrangement according to claim 10 wherein the receiving end of all tube means are located at the same elevation to minimize the effect of static pressure variations.

13. The arrangement according to claim 11 wherein the receiving end of all tube means at said location are at the same elevation to minimize the effect of static pressure variation.

14. A method for measuring a pressure caused by a flow, at a component within a flue gas desulfurization vessel, the method comprising the steps of:

locating tube means near the component for receiving a portion of the flow;

channeling the portion of the flow through the tube means to collection means for receiving the portion of the flow;

operatively connecting pressure measuring means to the collection means with valve means;

measuring the pressure of the flow at the component;

operatively connecting the collection means to cleaning means with valve means for cleaning the tube means;

cleaning the tube means;

operatively connecting drying means to the collection means with valve means;
drying the tube means; and
regulating operation of the pressure measuring means, the cleaning means, and the drying means with the valve means.

15. The method according to claim 14, further comprising the steps of determining a liquid flow based on the measured pressure.

* * * * *